Patented Feb. 6, 1945

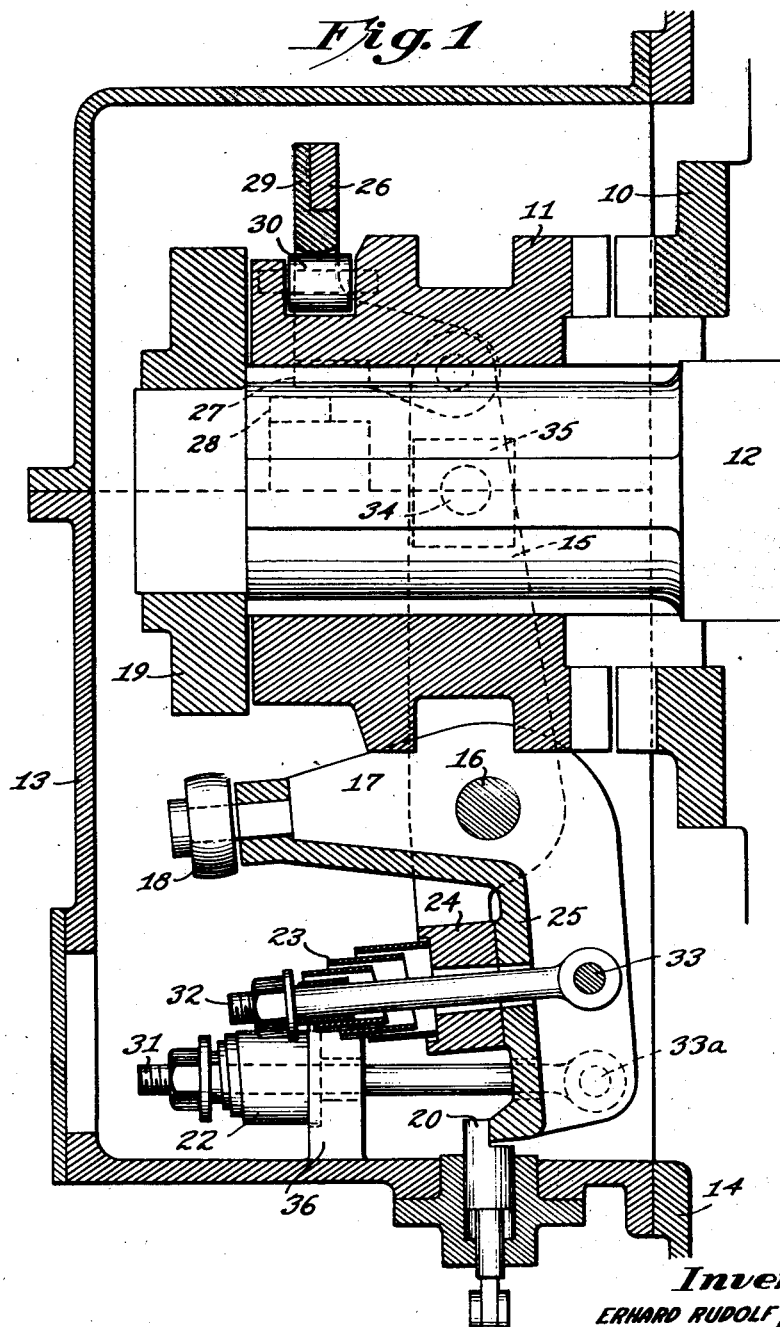

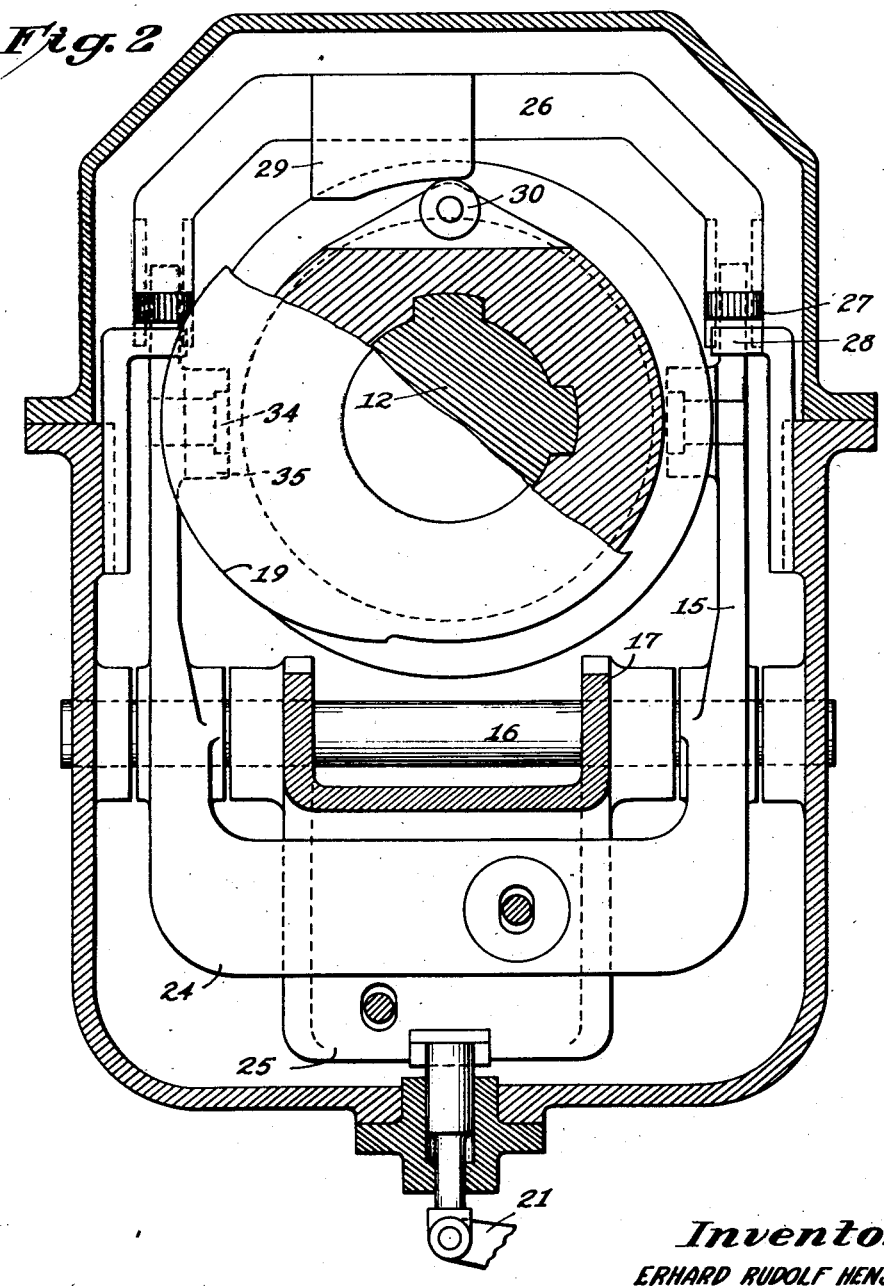

2,368,987

UNITED STATES PATENT OFFICE 2,368,987

CLUTCH

Erhard Rudolf Henschker, Parkstone, England, assignor to The Loewy Engineering Company Limited, London, England, a corporation of Great Britain Application April 11, 1941, Serial No. 388,103
In Great Britain February 10, 1940

20 Claims. (Cl. 192—33)

This invention refers to clutches for producing intermittent rotary motion from a continuously rotating member and, in particular, to clutches of this type which are used for transmitting power to a crank-driven shear, a power press or any other machine in which the operating cycle comprises one revolution only of the driven member, such as the crankshaft of the machine. To obtain this result, means are associated with these clutches which will automatically disengage the clutch after the driven member has completed one revolution.

The present invention is, in particular, concerned with the means for effecting and controlling the return of the clutch-operating gear into its "out" position.

In a known type of clutch the driven clutch member is moved into the "in" position by means of a spring and into the "out" position under the control of a cam or its equivalent mounted on the driven shaft after the latter has completed one revolution.

Because of its inertia the driven shaft will continue to rotate through a certain angle after the clutch halves have begun to separate. During this rotation, the clutch-operating gear remains under the control of the cam, which thus determines the clearance which will eventually be established between the clutch halves.

In most machines of the kind referred to above, the tendency of the driven member to continue its rotation is counteracted by strong forces. Furthermore, the speed of the moving masses is comparatively slow; thus a strong braking effect will be exerted on the driven member so that the angle through which the driven shaft will continue to rotate through the effect of its inertia will, in most cases, be very small, with the result that the shaft will come to rest as soon as the halves of the clutch are separated by an infinitesimal amount only.

In cases of claw- or dog-clutches, this clearance will be so small that the teeth of the clutch halves are liable to knock against each other when the face of the driven half wipes over the face of the driving half after disengagement. This has a deleterious effect in so far as it may lead to undue wear on the corners of the teeth which may in the end become rounded off so that conditions become still more aggravated. It is an object of the invention to provide a clutch for producing intermittent rotary motion from a continuously rotating member in which the clearance of the clutch halves will be of definite magnitude, so that no knocking of the teeth will occur.

It is a further object of the invention to provide a clutch in which the return movement of its operating gear is carried out in a positive manner.

It is a still further object of the invention to provide a clutch in which the forces which move the clutch into and out of engagement are transmitted to the clutch symmetricaly to its axis in such a way that no jamming of the clutch will occur.

The clutch according to the invention is of the kind referred to above, in which the clutch shifting lever is moved in its "in" or clutch engaging position by means of a spring, and is characterised in the first instance by the fact that the elements of the clutch operating gear which are instrumental in bringing the shifting lever into the "in" position, are returned into the "out" or clutch disengaging position before the driven shaft has completed its revolution, whilst the shifting lever itself is locked in the "in" position until the driven shaft has completed its revolution, whereupon the locking means are released and the shifting lever is returned into the "out" position.

In this way, the shifting lever, and thereby also the clutch half engaged by this lever, can effect their return movement independently from any cam control associated with the driven shaft and the clutch halves will, in the end, become separated by a clearance of definite magnitude.

In a more general aspect of the invention, the clutch according to the invention comprises a shifting lever, an actuating lever co-operating with the said shifting lever, means for moving both levers into the "in" position, means for locking the shifting lever in the "in" position, means for returning the actuating lever after the driven shaft of the clutch has been rotated through a predetermined angle, means for releasing the said locking means on further rotation of the driven shaft, and means for effecting the return of the said shifting lever into the "out" position.

According to a further feature of the invention, the locking means will come automatically into operation as soon as the shifting lever is moved into the "in" position.

According to a still further feature of the invention, the shifting lever is urged towards the actuating lever and also returned into its "out" position by means of a separate spring.

In order to establish a definite clearance for the two clutch halves in the disengaged condition, which is one of the objects of the invention, a stop is provided for limiting the return movement of the shifting lever in a positive manner.

In a preferred embodiment of the invention, separate cam means are associated with the driven member both for returning the actuating lever into the "out" position and for effecting a release of the locking means for the shifting lever, these cam means being so arranged with respect to one another that the return of the actuating lever is completed before the locking means are released.

In order to have the forces which move the clutch into and out of engagement transmitted symmetrically to the axis, the actuating lever and the shifting lever have central portions of substantial width in engagement with each other, both levers being further provided with corresponding arms symmetrically arranged at both sides of these portions which carry the means for engaging the cam and the slidable half of the clutch respectively.

In order to make the invention more clearly understood, one embodiment of the invention is described in detail with reference to the accompanying drawings, in which Fig. 1 is a sectional elevation of a clutch according to the invention, whereas Fig. 2 is an end view of the clutch, partly in section.

In the drawings, 10 denotes the driving half and 11 the driven half of a dog- or claw-clutch of conventional design. Driving half 10 may be fixed to a component part of a reduction gear (not shown here) or to any other power-transmitting apparatus. Driven half 11 is slidably mounted on a splined extension of a driven shaft 12 which may be the crankshaft of a power press, of an oscillating shear or any other type of machinery wherein the driven shaft makes one revolution only for a complete cycle of operations.

The clutch is of the well known type with intermeshing claws or dogs distributed over the faces of both the driving and the driven half. The clutch halves are mounted on the overhanging end of driven shaft 12 and are enclosed, together with their operating mechanism, within a two-part casing 13 which is placed outside the casing 14 of the reduction gear or some other kind of apparatus by means of which power is transmitted to the driving half 10.

The operating mechanism of the clutch with which the invention is primarily concerned comprises a shifting lever 15 pivoted about a transversal shaft 16, the lever being in engagement with a circumferential groove in driven half 11 of the clutch, by means of two studs 34 and blocks 35 in a well known manner, so that by rocking lever 15 in a clockwise or counter-clockwise direction as shown in Fig. 1, the two clutch halves will be engaged and disengaged respectively.

Pivoted about the shaft 16 is also an actuating lever 17 which carries on one end a roller 18 for co-operation with a cam 19 mounted on driven shaft 12.

On its other end actuating lever 17 is notched to receive trigger 20 which can be moved vertically by means of a manually or mechanically-operated lever 21, for locking or releasing the actuating lever 17.

In order to move the shifting lever 15 into its "in" position a spring 22 is provided which acts upon lever 17. A second spring 23 is provided which tends to urge shifting lever 15 towards actuating lever 17. As shown in Fig. 2, the lever 15 with its two arms and crossbeam 24 is U-shaped and pivots about shaft 16. On the same shaft the L-shaped actuating lever 17 is arranged between the arms of lever 15. Crossbeam 24 and a web 25 on lever 17 may be brought into abutting engagement with each other by means of the spring 23.

It will thus be seen that lever 15 will be carried along by lever 17 when the latter moves in a clockwise direction, and further, that lever 17 will act as a stop for lever 15 when the latter moves in a counter-clockwise direction.

Pivoted to the end of lever 15 is a stirrup 26 straddling the driven shaft, which has lugs 27 on its underside. When lever 15 is moved into the "in" position the lugs 27 are carried past stationary catch-plates 28 fixed to the side walls of casing 13, so that lever 15 will become locked in the "in" position.

In order to release lever 15, a cam 29 is arranged in the middle of stirrup 26 which co-operates with a roller 30 mounted on driven half 11. As soon as, in the course of rotation of driven half 11, this roller 30 rides over the cam 29, the stirrup 26 is raised and the lugs 27 are disengaged from the catch-plates 28.

Spring 22 is inserted between a rib 36 of casing 13 and a nut on bolt 31; spring 23 is inserted between crossbeam 24 on lever 15 and a nut on a second bolt 32. Both bolts are pivoted to lever 17 by means of pins 33a and 33 respectively whilst the rib 36 and the crossbeam 24 are suitably recessed to form seats for the two springs.

The operation of the clutch is as follows:

When the clutch halves are disengaged the parts of the operating mechanism are in the position shown in Fig. 1. The actuating lever 17 is held back by trigger 20 in its inoperative position, and shifting lever 15 is kept in abutting relation with lever 17 through spring 23, lever 15 thus being held in its "out" position. In order to operate the clutch, trigger 20 is pulled downwards by lever 21, whereupon both the shifting lever 15 and the actuating lever 17 are free to rotate about shaft 16 in a clockwise direction under the action of spring 22.

The clutch halves 10 and 11 are thereby moved into engagement with each other and driven shaft 12 begins to rotate. As stirrup 26 has been carried along by lever 15 on its forward movement and allowed to drop so that the lugs 27 have fallen in front of catch-plates 28, lever 15 has been locked in the meantime in the "in" position. The rotation of lever 17 has further brought the roller 18 near to cam 19.

This cam 19 is so shaped that, before shaft 12 has completed one revolution, lever 17 is depressed by the cam 19 and rotated backwards past the position in which it was held before by trigger 20. It is to be understood that lever 21 is normally biased by a counter-weight, a spring or a solenoid (not shown) to move trigger 20 upwards. In this way, lever 17, as soon as it has returned, will be caught by trigger 20 and thus re-set for a fresh operation.

During all this time, driven shaft 12 will continue its rotation since the shifting lever 15 is not affected through the return movement of actuating lever 17 and is, on the other hand, still being kept locked through the catch-plates 28. On further rotation, however, of shaft 12, roller 30 will come into contact with the projecting part of cam 29 and will lift the stirrup 26 with its lugs 27, so that the latter will be disengaged from the catch-plates 28. Lever 15 is thereby released to move and will be returned into its "out" position by spring 23.

All parts of the operating mechanism of the clutch are now in their initial position and a new cycle of operations can be started again by pulling trigger 20.

From the foregoing, it will be seen that the actuating lever will act only as a stop for the shifting lever 15 when the latter is returned to its "out" position and, furthermore, it is to be noted that the amount by which the shifting lever 15 will be returned by spring 23 is in no way affected by the position of cam 19, or of any other part associated with the driven shaft 12.

By this means the driven half 11 of the clutch will always be separated from the driving half 10 by an amount of definite magnitude.

It is also to be noted that transmission of force from the actuating lever 17 to the shifting lever 15 is effected by the parts 24 and 25 which both have wide surfaces of contact and are arranged symmetrically between the two arms of lever 15. Thus, the forces are also transmitted symmetrically, and any jamming or edging of the moveable clutch half 11 is obviated.

The above specification and the drawings give only one specific example of a number of possible arrangements in which the invention can be carried out into practice and it is to be understood that the invention is not limited to this specific embodiment.

It is to be understood that the term "clutch-shifting lever" as used throughout this specification and the claims is to be understood to cover also those kinds of levers which effect the shifting of the clutch indirectly through the intermediary of other members as well as directly as in the embodiment illustrated.

I claim:

1. In a clutch mechanism for transmitting rotary motion the combination with a continuously rotating member and a driven shaft of cooperating clutch members connected to the rotating member and the driven shaft respectively, one of which clutch members is movable to engaging and disengaging positions, a clutch shifting lever controlling the movable clutch member, an actuating lever cooperating with said clutch shifting lever, means for moving both levers into the clutch engaging position, means for locking the said shifting lever in the clutch engaging position, means actuated by the driven shaft for returning said actuating lever to initial position prior to and independent of the release of said locking means, means actuated by the driven shaft for releasing said locking means upon further rotation of said driven shaft and means for effecting the immediate return of said clutch shifting lever into the clutch disengaging position upon release of said locking means.

2. In a clutch mechanism for transmitting rotary motion, the combination with a continuously rotating member and a driven shaft of cooperating clutch members connected to the rotating member and the driven shaft respectively, one of which clutch members is movable to engaging and disengaging positions, a clutch shifting lever controlling the movable clutch member, an actuating lever cooperating with said clutch shifting lever, means for moving both levers into the clutch engaging position, locking means for holding said clutch shifting lever in clutch engaging position coming automatically into operation upon said clutch shifting lever being moved into the clutch engaging position, means actuated by the driven shaft for returning said actuating lever to initial position prior to and independent of the release of said locking means, means actuated by the driven shaft for releasing said locking means upon further rotation of said driven shaft and means for effecting the return of said clutch shifting lever into the clutch disengaging position upon release of said locking means.

3. In a clutch mechanism for transmitting rotary motion, the combination with a continuously rotating member and a driven shaft of cooperating clutch members connected to the rotating member and the driven shaft respectively, one of which clutch members is movable to engaging and disengaging positions, a clutch shifting lever controlling the movable clutch member, a trigger-controlled actuating lever operatively connected to said clutch shifting lever, means for moving both levers into the clutch engaging position, locking means for holding said clutch shifting lever in clutch engaging position coming automatically into operation upon said clutch shifting lever being moved into the clutch engaging position, means actuated by the driven shaft for returning said actuating lever to initial position prior to and independent of the release of said locking means, means connected to said driven shaft for releasing said locking means upon further rotation of said driven shaft, means for effecting the return of said clutch shifting lever into the clutch disengaging position and a stop for limiting the return movement of said clutch shifting lever in a positive manner.

4. In a clutch mechanism for transmitting rotary motion, the combination with a continuously rotating member and a driven shaft of cooperating clutch members connected to the rotating member and the driven shaft respectively, one of which clutch members is movable to engaging and disengaging positions, a clutch shifting lever controlling the movable clutch member, a trigger-controlled actuating lever for said clutch shifting lever, said levers having central portions of substantial width held in engagement with each other for power transmitting purposes, means for moving both levers into the clutch engaging position, locking means for said clutch shifting lever coming automatically into operation upon said clutch shifting lever being moved into the clutch engaging position, means actuated by the driven shaft for returning said actuating lever to initial position prior to and independent of the release of said locking means, means actuated by the driven shaft for releasing said locking means upon further rotation of said driven shaft, means for effecting the return of said shifting lever into the clutch disengaging position, and a stop for limiting the return movement of said shifting lever in a positive manner.

5. In a clutch mechanism, the combination with a continuously rotating member and a driven shaft of cooperating clutch members connected to the rotating member and the driven shaft respectively, one of which clutch members is movable to engaging and disengaging positions, a clutch shifting lever controlling the movable clutch member, a trigger-controlled actuating lever for said clutch shifting lever, a spring for moving both levers into the clutch engaging position, means for locking said clutch shifting lever in the clutch engaging position, means actuated by the driven shaft for returning said actuating lever to initial position prior to and independent of the release of said locking means, means actuated by the driven shaft for releasing said locking means on further rotation of said driven shaft, means for effecting the return of said shifting lever into the clutch disengaging position, and a stop for limiting the return movement of said shifting lever in a positive manner.

6. In a clutch mechanism, the combination with a continuously rotating member and a driven shaft of cooperating clutch members connected to the rotating member and the driven shaft respectively, one of which clutch members is movable to engaging and disengaging positions, a clutch shifting lever, a trigger-controlled actuating lever for said clutch shifting lever, a spring for moving both levers into the clutch engaging position, means for locking said clutch shifting lever in the clutch engaging position, means actuated by the driven shaft for returning said actuating lever to initial position prior to and independent of the release of said locking means, means actuated by the driven shaft for releasing said locking means on further rotation of said driven shaft and a second spring for effecting the return of said clutch shifting lever to clutch disengaging position.

7. In a clutch mechanism, the combination with a continuously rotating member and a driven shaft of cooperating clutch members connected to the rotating member and the driven shaft respectively, one of which clutch members is movable to engaging and disengaging positions, a clutch shifting lever, a trigger-controlled lever for said clutch shifting lever, said levers having central portions of substantial width held in engagement with each other for power transmitting purposes, a spring for bringing both levers into the clutch engaging position, means for locking said shifting lever in the clutch engaging position, means actuated by the driven shaft for returning the said actuating lever to initial position prior to and independent of the release of said locking means, means actuated by the driven shaft for releasing said locking means on further rotation of said driven shaft, a second spring for effecting the return of said clutch shifting lever to clutch disengaging position, and a stop for limiting the return movement of said clutch shifting lever in a positive manner.

8. In a clutch mechanism, the combination with a continuously rotating member and a driven shaft of cooperating clutch members connected to the rotating member and the driven shaft respectively, one of which clutch members is movable to engaging and disengaging positions, a clutch shifting lever, an actuating lever cooperating with said clutch shifting lever, means for moving both levers into the clutch engaging position, means for locking said shifting lever in the clutch engaging position, a cam mounted on said driven shaft for returning said actuating lever to its initial position while the clutch shifting lever is being kept locked in the clutch engaging position, means actuated by the driven shaft for releasing said locking means upon further rotation of said driven shaft and means for effecting the return of said shifting lever to clutch disengaging position.

9. In a clutch mechanism, the combination with a continuously rotating member and a driven shaft of cooperating clutch members connected to the rotating member and the driven shaft respectively, one of which clutch members is movable to engaging and disengaging positions, a clutch shifting lever, an actuating lever cooperating with said clutch shifting lever, said levers having central portions of substantial width, held in engagement with each other for power transmitting purposes, a transverse shaft for pivotally mounting both levers, means for moving both levers into the clutch engaging position, locking means for said clutch shifting lever coming automatically into operation upon said lever being moved into the clutch engaging position, means actuated by the driven shaft for returning said actuating lever to initial position prior to and independent of the release of said locking means, means actuated by the driven shaft for releasing said locking means upon further rotation of the driven shaft and means for effecting the return of said clutch shifting lever into the clutch disengaging position.

10. In a clutch mechanism, the combination with a continuously rotating member, a driven shaft, and a clutch operatively connecting the same, of a clutch shifting lever, an actuating lever cooperating with said clutch shifting lever, means for moving both levers into the clutch engaging position, locking means for said shifting lever coming automatically into operation upon said shifting lever being moved into the clutch engaging position, means for returning said actuating lever into the initial position, means for releasing said locking means, both said returning means and said releasing means being operatively connected to said driven shaft and coming successively into operation, means connected to the actuating lever for effecting the return of said clutch shifting lever into the clutch disengaging position and a stop for limiting the return movement of said shifting lever in a positive manner.

11. In a clutch mechanism, the combination with a continuously rotating member and a driven shaft of cooperating clutch members connected to the rotating member and the driven shaft respectively, one of which clutch members is movable to engaging and disengaging positions, a shifting lever, a trigger-controlled actuating lever for said clutch shifting lever, means for moving both levers into the clutch engaging position, means for locking said clutch shifting lever in the clutch engaging position, means for returning said actuating lever to the initial position, means for releasing said locking means, both said returning means and said releasing means being controlled by the rotary movement of said driven shaft so as to come successively into operation, means connected to the actuating lever for effecting the return of said clutch shifting lever into the clutch disengaging position, and a stop for limiting the return movement of said clutch shifting lever in a positive manner.

12. In a clutch mechanism of the character described, the combination with a driving member and a driven member of interengaging clutch members connected respectively to the driving and driven members, one clutch member being movable to and from operative engaging position, and means for shifting such clutch member from engaging to disengaging position comprising a clutch shifter, spring means adapted to be set to yieldably urge said clutch shifter to clutch disengaging position, means actuated by rotation of the driven member to set said spring means, and means controlled by rotation of the driven member to prevent movement of said clutch shifter during a portion of a rotation of the driven member and to release the same when the driven member reaches a pre-determined position.

13. In a clutch mechanism of the character described, the combination with a driving member and a driven member of interengaging clutch members connected respectively to the driving and driven members, a spring actuated clutch shifting mechanism for disconnecting said clutch members, a latch mechanism for holding the spring actuated clutch shifting mechanism against action, a cam actuated by the driven member connected to set the spring actuated clutch shifting mechanism during rotation of the driven shaft and a tripping mechanism rotatable with the driven shaft for releasing said latch mechanism at a predetermined rotative position of the driven shaft to permit disengagement of the clutch members.

14. In a clutch mechanism of the character described, the combination with a driving member and a driven member of interengaging clutch members connected respectively to the driving and driven members, one of which clutch members is movable to and from driving position, a clutch shifting lever connected to move said movable clutch member, an actuating lever cooperating with said clutch shifting lever, a spring connection between said levers yieldably urging the clutch shifting lever to cause disengagement of the movable clutch member when the actuating lever is moved in clutch disengaging direction, a latch for releasably holding said clutch shifting lever in clutch engaging position against the tension of said spring connection, and means controlled by rotation of the driven member for causing said latch to release the clutch shifting lever to permit disengagement of the movable clutch member at a predetermined position of the driven member.

15. In a clutch mechanism of the character described, the combination with a driving member and a driven member, of a clutch operatively connected between the driving and driven members, and means for disconnecting said clutch comprising a clutch shifter, spring means adapted to be set to yieldably urge said clutch shifter to clutch disconnecting position, means actuated by rotation of the driven member to set said spring means, and means to prevent movement of said shifter during a portion of a rotation of the driven member in which the spring means is set, and means to release the shifter after the spring means is set.

16. In a clutch mechanism of the character described, the combination with a continuously rotating member, of a clutch member adapted to be moved into and out of engaging position, a mechanism comprising a clutch shifting lever and an actuating lever operatively connected thereto, means for moving the actuating lever and the shifting lever from initial to clutch engaging position, and means to move the actuating lever to clutch disengaging position without moving the clutch shifting lever and for applying tension to the shifting lever to prepare the same for operation, means to lock the clutch shifting lever in clutch engaging position, and means operated by further rotation of the driven shaft for unlocking the shifting lever, substantially as described.

17. In a clutch mechanism of the character described, the combination with a driving member and a driven member of inter-engaging clutch members connected respectively to the driving and driven members, one of which clutch members is movable to and from the driving position, a clutch-shifting lever connected to move said movable clutch member, an actuating lever adapted to move said shifting lever into the clutch-engaging position, a spring connection between said actuating and shifting levers yieldably urging said shifting lever in a clutch-disengaging direction, a latch for locking said shifting lever in the clutch-engaging position, a cam on said driven member adapted to return said actuating lever into its initial position whilst the shifting lever remains locked in the clutch-engaging position, and a second cam on said driven member adapted to trip said latch on further rotation of said driven member.

18. In a clutch mechanism of the character described, the combination with a driving member and a driven member of inter-engaging clutch members connected respectively to the driving and driven members, one of which clutch members is movable to and from the driving position, a clutch-shifting lever connected to move said movable clutch member, a trigger-operated actuating lever for said shifting lever, spring means for moving said actuating lever, together with the shifting lever in a clutch-engaging direction after release of said trigger, a spring connection between said actuating and shifting levers yieldably urging said shifting lever in a clutch-disengaging direction, a latch for locking said shifting lever in the clutch-engaging position, a cam on said driven member adapted to return said actuating lever into its initial position whilst the shifting lever remains locked in the clutch-engaging position, and a second cam on said driven member adapted to trip said latch on further rotation of said driven member.

19. In a clutch mechanism of the character described, the combination with a driving member and a driven member of inter-engaging clutch members connected respectively to the driving and driven members, one of which clutch members is movable to and from the driving position, a clutch-shifting lever connected to move said movable clutch member, an actuating lever adapted to move said shifting lever into the clutch-engaging position, a spring connection between said actuating and shifting levers yieldably urging said shifting lever in a clutch-disengaging direction, a common transverse shaft for pivotally supporting both said actuating and said shifting levers, both said levers having inter-engaging thrust-transmitting surfaces symmetrically disposed with respect to the axis of rotation of said clutch members, a latch for locking said shifting lever in the clutch-engaging position, a cam on said driven member adapted to return said actuating lever into its initial position whilst the shifting lever remains locked in the clutch-engaging position, and a second cam on said driven member adapted to trip said latch on further rotation of said driven member.

20. In a clutch mechanism of the character described, the combination with a driving member and a driven member of inter-engaging clutch members connected respectively to the driving and driven members, one of which clutch members is movable to and from the driving position, a clutch-shifting lever connected to move said movable clutch member, an actuating lever adapted to move said shifting lever into the clutch-engaging position, a spring connection between said actuating and shifting levers yieldably urging said shifting lever in the clutch-engaging position, a cam on said driven member adapted to return said actuating lever into its initial position whilst the shifting lever remains locked in the clutch engaging position, a second cam on said driven member adapted to trip said latch on further rotation of said driven member, said first and second cam being arranged at such angular distances on said driven member that said latch is tripped only after said actuating lever has resumed its initial position.

E. R. HENSCHKER.